J. M. WILKINSON.
Animal-Trap.

No. 165,643.

Patented July 13, 1875.

Witnesses
W. Bradford.
J. M. Mister.

Inventor
John M. Wilkinson
Edson Bros.
Attorneys.

N. PETERS, PHOTO-LITHOGRAPHER, WASHINGTON, D. C.

UNITED STATES PATENT OFFICE.

JOHN M. WILKINSON, OF JACKSON, TENNESSEE.

IMPROVEMENT IN ANIMAL-TRAPS.

Specification forming part of Letters Patent No. 165,643, dated July 13, 1875; application filed April 17, 1875.

*To all whom it may concern:*

Be it known that I, J. M. WILKINSON, of Jackson, in the county of Madison and State of Tennessee, have invented certain new and useful Improvements in Animal-Traps; and I do hereby declare that the following is a full, clear, and exact description thereof, which will enable others skilled in the art to which it pertains to make and use the same, reference being had to the accompanying drawing and to the letters of reference marked thereon, which form a part of this specification, in which—

Figure 1:
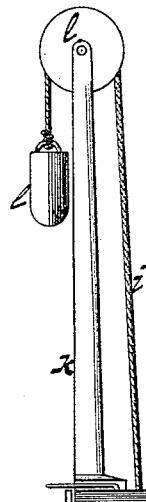
Figure 1:
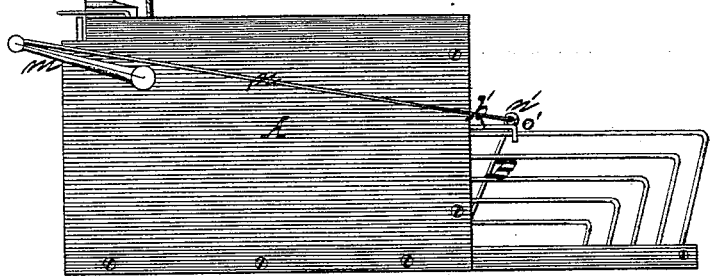
Figure 2:
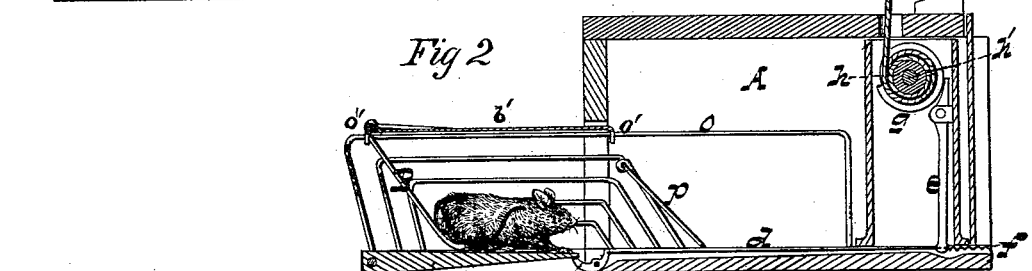
Figure 3:
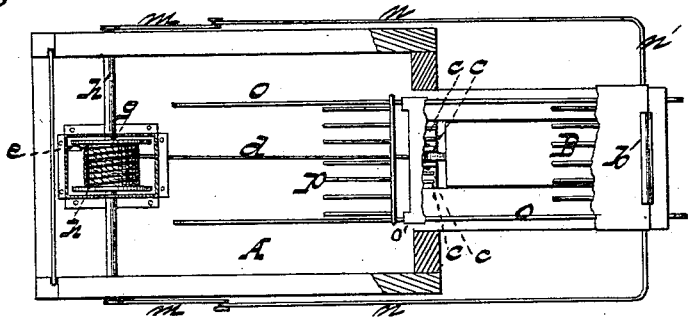

Figure 1 is a side elevation of my improved animal-trap. Fig. 2 is a vertical section, and Fig. 3 a plan view, thereof.

Corresponding parts in the several figures are denoted by like letters.

This invention relates to a certain improvement in animal-traps; and it consists of a gate so adjusted and connected to a pivoted platform as that, when the animal steps on the latter, it will fly out past and, upon its return movement, force the animal into the trap or cage, substantially as hereinafter more fully specified.

To enable others skilled in the art to which my invention appertains to make and use the same, I will proceed to describe it.

In the annexed drawing, A refers to the cage for receiving and holding the caught animal, having the pivoted platform $a$, whose inner end rests upon one arm of a bell-crank or trigger, $b$, pivoted in the bottom of the cage A. Just at this point are the baiting wires or projections $c\ c$. The opposite arm of the bell-crank or trigger $b$ is connected by a rod, $d$, to the lower end of a pawl or detent, $e$, pivoted between projections attached to the inner surface of the rear end of the cage. To the rear side of the lower end of the pawl or detent $e$ is attached a spring, $f$, attached, at its opposite end, to some convenient point on the floor of the cage, to cause the upper end of the said pawl or detent to engage the cam $g$, and by it the pivoted platform $a$ may be made greater or less sensitive to the weight of the entering animal. The cam $g$ is attached to a drum, $h$, upon an axis, $h'$, having its bearings in the sides of the cage. Around the drum $h$ is wound a rope or cord, $i$, passing up through the cage and over a pulley, $j$, in an upright, $k$, secured upon the cage, and thence attached to a weight, $l$. To the projecting ends of the axis $h'$ are attached cranks $m\ m$, connected to rods $n\ n$ of the frame $n'$, from which is suspended or depends the gate B, with the lower ends of its bars curved and resting on the floor of the cage. The upper end of the gate is provided with a plate, $b'$, having eyes $o'\ o'$ to adjust it to an elevated track, $o\ o$, fastened in the floor of the cage, and upon which the gate travels back and forth.

It is obvious that, in lieu of the eyes $o'\ o'$, the elevated track $o\ o$ may be provided with longitudinal slots or grooves to receive the ends of the plate $b'$, which may be exchanged for a rod, to better adapt it for sliding in the said grooves.

In lieu of the cord $i$ and its weight $l$, a spring may be used, which will dispense with the upright or post $k$ and pulley $j$.

The operation of my trap is as follows: The gate B being in the position shown in figures of the drawing and the bait in place on the wires $c\ c$, the entering animal, as he reaches the inner end of the pivoted platform $a$, will depress said end of the latter, which will operate the bell-crank or trigger $b$ and rod $d$, so as to retract the pawl or detent $e$ from the cam $g$, permitting the weight $l$ or spring to put the drum $h$ and axis $h'$ in rapid motion, in turn imparted to the cranks $m\ m$, rods $n\ n$, and gate B, causing the latter to fly past and over the animal, and, upon its return movement, force him into the cage A, when the door $p$ will confine him therein. At this juncture the spring $f$ will throw the upper end of the pawl or detent $e$ into the cam $g$, and thus reset the trap, bringing the gate to its original position.

Having thus described my invention, what I claim, and desire to secure by Letters Patent, is—

1. In an animal-trap, the hinged sliding gate B $b'$, having the eyes $o'\ o'$, or their equivalents, in combination with the elevated track or way $o\ o$, constructed to operate substantially as and for the purpose set forth.

2. The pivoted platform $a$, bell-crank or trigger $b$, rod $d$, and pawl or detent $e$, having the spring, in combination with the drum $h$, operated by a weight or spring, the axis $h'$, cranks $m\ m$, rods $n\ n$, elevated track $o\ o$, and gate B, substantially as and for the purpose set forth.

In testimony that I claim the foregoing as my own, I affix my signature in presence of two witnesses.

JOHN MARION WILKINSON.

Witnesses:
WM. G. SMITH,
N. G. SMITH.